United States Patent [19]

Nozawa et al.

[11] 4,174,790

[45] Nov. 20, 1979

[54] SPRAYER USABLE IN BOTH ERECT AND INVERTED STATES

[75] Inventors: Takamitsu Nozawa; Takayuki Goto; Takao Kishi; Shigeo Iizuka, all of Tokyo, Japan

[73] Assignee: Yoshino Kogyosho Co., Ltd., Tokyo, Japan

[21] Appl. No.: 894,918

[22] Filed: Apr. 10, 1978

[30] Foreign Application Priority Data

| | | | |
|---|---|---|---|
| May 12, 1977 | [JP] | Japan | 52-60424[U] |
| May 18, 1977 | [JP] | Japan | 52-57448 |
| Jun. 6, 1977 | [JP] | Japan | 52-74188[U] |
| Aug. 20, 1977 | [JP] | Japan | 52-111638[U] |

[51] Int. Cl.[2] ........................ B05B 9/043; B05B 11/02; G01F 11/36

[52] U.S. Cl. ........................ 222/321; 222/385

[58] Field of Search ................ 239/331, 333; 222/321, 222/380, 383, 385

[56] References Cited

U.S. PATENT DOCUMENTS

| | | | |
|---|---|---|---|
| 3,908,870 | 9/1975 | Nozawa et al. | 222/385 X |
| 4,017,031 | 4/1977 | Kishi et al. | 222/321 X |
| 4,079,865 | 3/1978 | Kutik | 222/385 X |

FOREIGN PATENT DOCUMENTS

| | | | |
|---|---|---|---|
| 88512 | 2/1967 | France | 239/333 |
| 1473120 | 3/1967 | France | 239/333 |

*Primary Examiner*—David A. Scherbel

[57] ABSTRACT

A sprayer designed usable in both erect and inverted states and a pump mechanism therefor, comprising a pressure chamber consisting of a cylinder and a piston, a pair of check valves provided in opposition to each other below said pressure chamber, a liquid inlet hole allowing flow of the liquid in the liquid container from its neck side portion into said pressure chamber when the sprayer is brought to its inverted position, and a skirt member adapted to inhibit leakage of the liquid to the spray head from said liquid inlet hole when the sprayer is in its inverted position. Inflow of the liquid and air into the pressure chamber is perfectly inhibited by the two check valves when the sprayer is either in its erect position or in its inverted position.

17 Claims, 12 Drawing Figures

SPRAYER USABLE IN BOTH ERECT AND INVERTED STATES

FIELD OF THE INVENTION AND PRIOR ART

This invention relates to a sprayer usable in either erect or inverted state and a pump mechanism therefor.

There is known a sprayer device in which two suction pipes, one extending to the bottom and the other to upper neck portion of the liquid container, are provided at the liquid inlet port of the liquid pressurizing means for allowing normal use of the sprayer in either erect or inverted state. In such device, however, the internal capacity of the liquid container is lessened owing to the presence of the upwardly extending suction pipe. Also, the production process of such device involves many difficulties as it needs to give a consideration to the space for arrangement of said suction pipes and there is also the necessity to enlarge the neck portion of the liquid container for inserting the spraying means and to connect the two suction pipes.

This inventor has manufactured by way of trial a liquid sprayer which can be used in both erect and inverted states with no upwardly extending suction pipe provided. In this trial device, a liquid suction hole is provided at an upper part of the cylinder of the pressing means for allowing inflow of the liquid when the sprayer is brought to an inverted position, and a check valve is provided between the pressing means and the suction pipe extending to the bottom of the liquid container.

This check valve is required to have the double functions to inhibit suction of the liquid and inflow of air when the sprayer is either in the erect state or in the inverted state. For providing such functions to the check valve, it is necessary to design and manufacture such valve with high precision by taking into consideration the weight of the valve body, distance between the valve hole and valve body, and other particulars. Also, it is liable that even thus fabricated check valve should fail to perform its proper functions when the sprayer is at a certain angular position or when pressure application is insufficient. For instance, if the valve body weight is too small, the valve hole might be closed by the valve body under the force of the influent liquid when the liquid is sucked in use of the sprayer in the erect state, resulting in insufficient suction of the liquid. On the other hand, if the valve body weight is too large, said valve body might fail to rise up when pressure is applied in use of the sprayer in the inverted state, and in such a case, the valve hole is not properly closed to cause insufficient build up of pressure in the pressure chamber.

The present invention is intended to provide a sprayer usable in either erect or inverted state in which, in order to eliminate the above-said defects, a liquid inlet hole is provided in the cylinder of the pressurizing means for allowing inflow of the liquid when the sprayer is in its inverted position and also two check valves are provided between said pressurizing means and the liquid intake pipe.

OBJECTS OF THE INVENTION

The primary object of this invention is to realize enlargement of the internal capacity of the liquid container, decrease of the component parts required, and simplification of the production process by unnecessitating the separate provision of the suction pipe for sucking in the liquid when the sprayer is used in the inverted position.

Another object of this invention is to enable installation of check valves in the cylinder of the pressure chamber by providing a suction hole in said cylinder instead of providing a suction pipe for inverted use of the sprayer.

Still another object of this invention is to effectuate perfect inhibition of suction of the liquid and inflow of air by means of two check valves when the sprayer is used in either erect or inverted state.

It is also envisaged in this invention to allow easy incorporation of a pump mechanism having two check valves and a liquid suction hole adapted to allow inflow of the liquid when the sprayer is brought to its inverted use position.

DETAILED DESCRIPTION OF THE INVENTION

Figure 1:
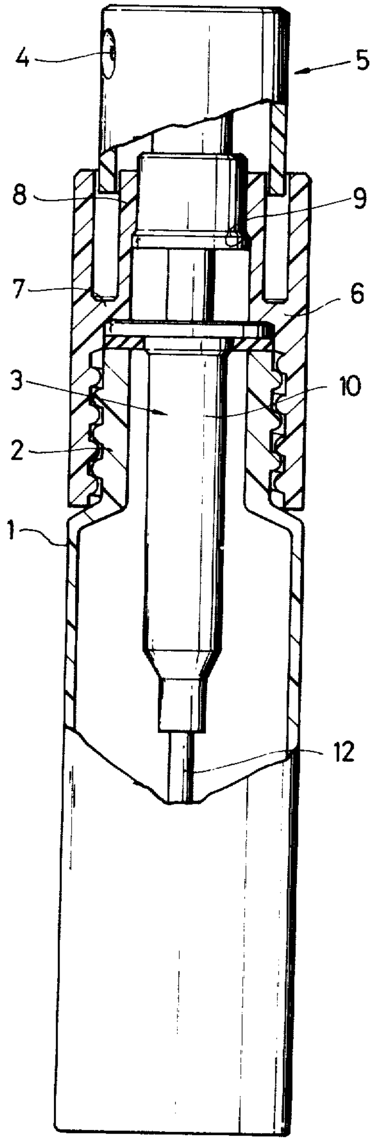
FIG. 1 is a general side view, with parts cut away, of a sprayer usable in both erect and inverted positions according to a first embodiment of this invention.

The device of this invention is first described by way of a first embodiment thereof with reference to FIGS. 1, 2, 3 and 4A, 4B and 4C of the accompanying drawings.

The sprayer usable in both erect and inverted states according to this invention comprises a liquid container 1, a pump mechanism 3 inserted into said liquid container through its neck portion 2, and a spray head 5 having a nozzle hole 4 and mounted above said pump mechanism 3. The lower portion of a cylindrical holder 6 is threadedly engaged around the neck portion 2 of the liquid container 1. Said cylindrical holder 6 is provided with a flange 7 that extends inwardly toward the center of the sprayer body, and an inner cylindrical member 8 is formed extending upwardly from the inner periphery of said flange 7. Said inner cylindrical member is so designed that a large-diameter cylinder (to be described later) may slide along the interior surface of said cylindrical member 8. At the middle part of the interior surface of said cylindrical member 8 is provided a stepped portion or protuberance 9 for limiting the upward movement of said large-diameter cylinder. Provided in the pump mechanism 3 is a small-diameter cylinder 10 having a flange 10a at its top opening, said flange 10a resting on the top end of the neck portion 2 through a packing 20. These members are held by the flange 7 of the cylindrical holder 6 to secure the small-diameter cylinder 10 in the neck portion 2 of the liquid container 1. In the inlet opening 11 at the lower end of the small-diameter cylinder 10 is provided a suction pipe 12 which extends to the bottom of the liquid container 1. Disposed in the small-diameter cylinder 10 is a small-diameter piston 13 which is held in position by an upwardly extending tubular holding member 14, and a large-diameter piston 15 is provided at the upper end of said holding member 14. The large-diameter piston 15 is slidably fitted in the large-diameter cylinder 16 that can slides in the inner cylindrical member 8. Provided interiorly of said holding member 14, small-diameter piston 13 and large-diameter piston 15 is a tubular passage 17 which connects a lower part of the small-diameter cylinder 10 to an upper part of the large-diameter cylinder 16. Said small-diameter cylinder 10, tubular passage 17 and large-diameter cylinder 16 constitute a pressure chamber 8. A valve body 19 is adapted in the upper part of the tubular passage 17 such that a valve hole 21 formed in the top wall of the large-diameter cylinder will be opened and closed by said valve body 19. The valve hole 21 is in communication with the nozzle hole 4 in the spray head 5 through a tube 22, and the discharge of the pressurized liquid in the pressure chamber 18 is controlled by a discharge valve V constituted from said valve body 19 and valve hole 21.

Figure 2:
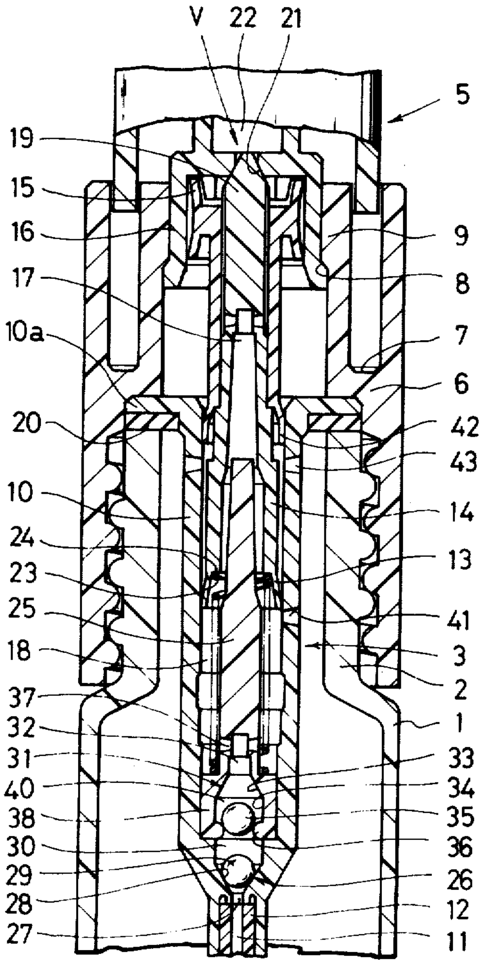
FIG. 2 is a sectional view of the principal parts in the sprayer of FIG. 1.
Figure 3:
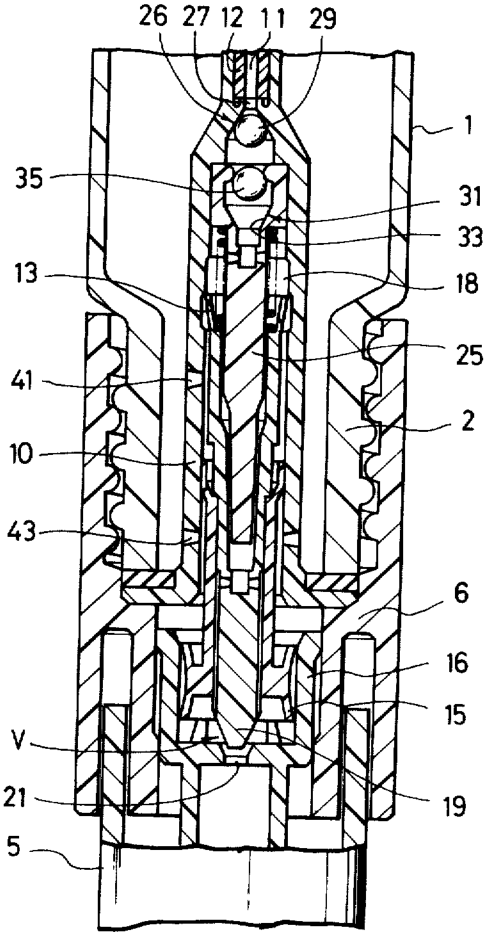
FIG. 3 is a sectional view similar to FIG. 2 but showing the sprayer in its inverted position.

Interposed between the small-diameter piston 13 and the small-diameter cylinder 10 is a coil spring 23 adapted to upwardly press the small-diameter piston 13, holding member 14 and large-diameter piston 15. The upper end of said coil spring 23 abuts against a stepped portion 24 of the small-diameter piston 13 while the lower end of said coil spring abuts against the proximal end of an insert bar 25 provided in the lower part of the small-diameter cylinder 10. Said insert bar 25 is adapted to increase the pressurizing efficiency in the pressure chamber 18, and the lower part of said bar is in water-tight contact with the inner wall of the small-diameter cylinder 10. As shown in FIG. 2, the holding member 14 is constituted from two vertically arranged members and the valve body 19 is secured to the holding member 14, so that the spray head 5 and the large-diameter and small-diameter pistons 15 and 13 can move integrally with each other through the contact relation of said valve body 19 and valve hole 21. When pressure builds up in the pressure chamber 18, both large-diameter and small-diameter pistons 15 and 13 are forced to move separately from the spray head 5 by the depressing force produced owing to the areal difference between the large-diameter piston 15 and the small-diameter piston 13, and such movement causes the valve body 19 to separate from the valve hole 21 to open it.

Disposed above the bottom inlet opening 11 of the small-diameter cylinder 10 is a first check valve 26 adapted to admit the liquid into the small-diameter cylinder 10 alone. This first check valve 26 consists of a valve seat 28 having a valve hole 27 communicated with the liquid container 1, a ball valve 29 and a valve chamber 30. At a location upward of said first check valve, that is, immediately beneath the insert bar 25, is provided a second check valve 31 which allows passage of the liquid into the liquid container 1 but inhibits inflow of the air into the pressure chamber 18 when the sprayer is in its inverted position. This second check valve consists of a valve seat 33 having a valve hole 32 connecting into the pressure chamber 18, a ball valve 35 in the valve chamber 34 and a ball valve support member 36. The ball valve 35 used in the second check valve 31 is provided with a certain weight or a certain space 40 is formed between the ball valve 35 and the support member 36 or the inner wall of the valve chamber 34 so that when the liquid is sucked in the erect state of the sprayer, the liquid which has passed the valve hole 32 will flow into the pressure chamber 18 through a passage 37 in the insert bar 25 with no possibility that the valve hole 32 in the valve seat 33 be closed by the ball valve 35 under the force of the inflent liquid or negative pressure.

Figure 4A:
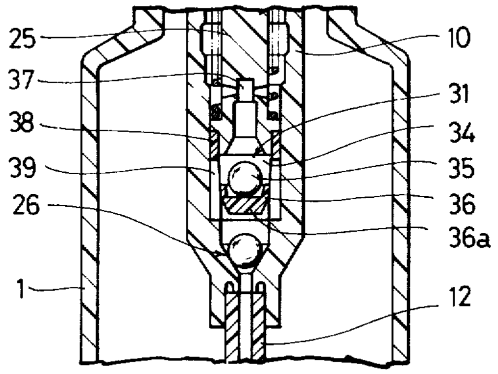
FIG. 4A is a sectional view showing a modification of the second check valve in the first embodiment of this invention.

In order to perfectly prevent the valve hole 32 in the valve seat 33 from being closed by the ball valve 35 in the second check valve 31 when the liquid is sucked in the erect state of the sprayer, said support member 36 may be constituted to form a saucer-like portion 36a as shown in FIG. 4A. In this case, a liquid passage 39 is provided between the small-diameter cylinder 10 and the side wall of the valve case 38 which forms the valve chamber 34 by cutting off several portion of the side wall of the valve case 38. According to this arrangement, the liquid sucked into the small-diameter cylinder 10 by raising the ball valve 29 of the first check valve 26 impinges against the side wall of the saucer-like portion 36a and smoothly flows into the valve chamber 34 through the passage 39 without forcing any improper movement of the ball valve 35, thus perfectly preventing unexpected closure of the valve hole 32 by the ball valve 35.

In case said insert bar 25 is not provided in the pressure chamber 18, the second check valve is disposed below the small-diameter cylinder 10 and the coil spring 23 is loaded thereon.

At the central part of the small-diameter cylinder 10 is provided a suction hole 41 for sucking the liquid into the pressure chamber 18 from the liquid container 1 through its neck portion 2 when the sprayer is in its inverted position. The position of said suction hole 41 is selected such that it will be located slightly below the small-diameter piston 13 when the sprayer is in its erect position, that is, when the capacity of the pressure chamber 18 is at its maximum, so that the liquid is sucked into the pressure chamber 18 in a negative pressure condition when the small-diameter piston 13 returns by passing through the suction hole 41 when the sprayer is brought to its inverted position. A skirt member 42 is provided to the holding member 14 of the large-diameter and small-diameter pistons 15, 13 to prevent leakage of the liquid which flows out of the pressure chamber 18 from the suction hole 41 when the sprayer is inverted. The position of the skirt member 42 mounted to the holding member 14 is selected such that it will be located slightly upward of the suction hole 41 when the pressure chamber 18 of the erected sprayer is at its minimum capacity. Also provided at an upper part of the small-diameter cylinder 10 is a small hole 43 which passes the air but not the liquid, thereby to prevent build up of negative pressure in the liquid container 1.

It is desirable to make arrangement such that the skirt member 42 will be positioned slightly upward of the small hole 43 when the pressure chamber 18 is maximized in its capacity with the sprayer being in its erect position.

Now the spraying operation of the above-described sprayer device of this invention is discussed. When the sprayer is in its erect state, as shown in FIG. 2, no pressure is built up in the pressure chamber 18 until the suction hole 41 is closed with descent of the small-diameter piston-like portion 13, but when the spray head 5 is depressed against the coil spring 23 and the suction hole 41 is closed, the pressure chamber 18 is pressurized as the first check valve is brought into a closed condition. As the pressure in the pressure chamber 18 elevates, said two pistons 15, 13 are forced to descend due to the difference between the forces acting to these two pistons 15, 13, causing the valve body 19 to move away from the valve hole 21 to let it opened. When the depression on the spray head 5 is released, said both large-diameter and small-diameter pistons 15, 13 are urged to rise up by the force of the coil spring 23 to create a negative pressure in the pressure chamber 18, so that the first check valve 26 is opened to suck up the liquid from the liquid container 1 into the pressure chamber 18 through said first check valve 26 and second check valve 31. During this operation, the liquid flows in the space 40 between the ball valve 35 and the peripheral wall of the valve chamber 34 in the second check valve 31, or the liquid flows through the passage 39 located sidewise of the saucer-like support member 36, so that the liquid impinges directly against the saucer portion 36a without forcing any improper movement of the ball valve 35, and hence there is no possibility that the valve hole 32 be closed by the ball valve 35.

In use of the sprayer in its inverted state (condition of FIG. 3), when the spray head 5 is depressed against the coil spring 23, pressure is built up in the pressure chamber 18 and the valve hole 27 is closed by the ball valve 29 of the first check valve assembly 26. As a result, the pressure in the pressure chamber 18 is further elevated, causing the valve body 19 to move away from the valve hole 21 to open it in the same way as when the sprayer is used in its erect position. When the depression on the spray head 5 is released, both large-diameter and small-diameter pistons 15, 13 are forced back to their original positions by the coil spring 23. As a negative pressure develops consequently in the pressure chamber 18, the ball valve 35 of the second check valve 31 is pressed against the valve seat 33 to close the second check valve 31. This prevents the air from entering the pressure chamber 18 through the suction pipe 12 which is exposed at its end above the liquid surface in the liquid container 1 in the inverted state, thus allowing sufficient build-up of the negative pressure. When the large-diameter and small-diameter pistons 15, 13 return to their original positions, the small-diameter piston 13 passes over the suction hole 41 while the pressure chamber 18 stays in a negatively pressurized condition, so that the liquid flows into the pressure chamber 18 from the neck portion 2 of the liquid container 1 through the suction hole 41.

Figure 4B:
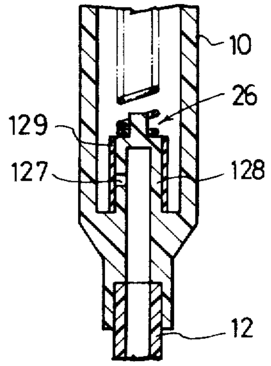
FIGS. 4B and 4C are sectional views showing modifications of the first check valve in the first embodiment of this invention.

In the above-described embodiment, the first check valve 26 is constituted from a ball valve 29 and a valve seat 28, but the first check valve may be constituted by providing a small cylindrical member 128 having a valve hole 127 and designed to double as valve seat at the lower end of the small-diameter cylinder 10 and adapting a ring-shaped rubber valve 129 around said small cylindrical member as shown in FIG. 4B. In this case, the liquid is allowed to flow into the small-diameter cylinder 10 alone from the suction pipe 12 against the elastic force of the rubber valve 129.

Figure 4C:
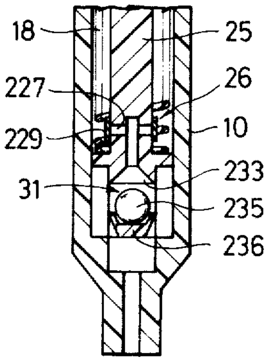

Another modification of the first check valve 26 is shown in FIG. 4C. In this case, the first check valve 26 is incorporated at a location upward of the second check valve 31 and below the insert bar 25. Provided at a location below the insert bar 25, that is, at the position corresponding to the passage 27, is a valve hole 227 which connects the pressure chamber 18 to the bottom of the small-diameter cylinder 10, and a ring-shaped rubber valve 229 adapted to open and close said valve hole 227 is provided to the insert bar 25. The second check valve 31 consists of a valve seat 233 provided at the lower end of the insert bar 25, a ball valve 235 and a saucer-like support member 236. Although a ball valve 35 is used as valve body in this second check valve 31, it is also possible to use a plate valve.

The operations of these first and second check valves are same as those of the corresponding valves in the first embodiment. The first check valve 26 is designed to usually close the valve hole 227 by dint of the elastic force of the rubber valve 229.

Owing to these two check valves and the liquid suction hole, it is possible to control suction of the liquid and inflow of the air into the pressure chamber no matter whether the sprayer is in its erect position or in its inverted position. Also, since there is no need of separately providing a liquid suction pipe for the inverted use of the sprayer, the internal capacity of the container is increased.

Figure 5:
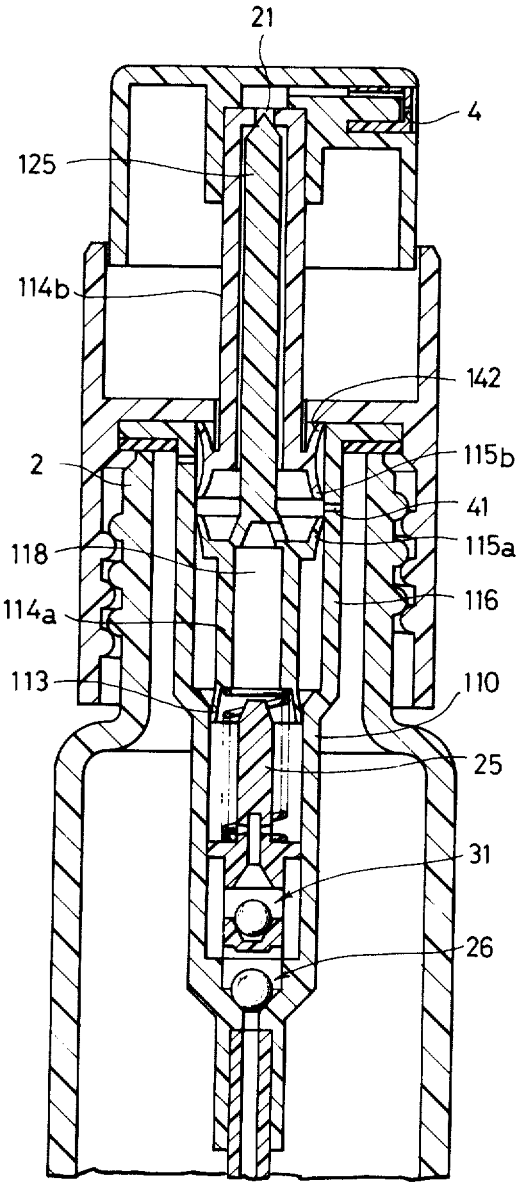
FIG. 5 is a sectional view of the principal parts of a sprayer according to a second embodiment of this invention.

Referring now to FIG. 5, there is shown a sprayer usable in both erect and inverted states according to a second embodiment of this invention. In this embodiment, the small-diameter cylinder 110 and the large-diameter cylinder 116 are joined integral to each other, and this integral cylinder body is secured to the neck portion 2 of the liquid container 1. The valve body 125 adapted to open and close the valve hole 21 communicated with the nozzle hole 4 is elongated like a bar, and a tubular liquid passage 114b is provided around said valve body 125. A small-diameter piston 113 is inserted into said small-diameter cylinder 110, and a large-diameter piston 115a is provided above said small-diameter piston 113 through a holding member 114a, with the proximal end of said valve body 125 being secured to the top of said large-diameter piston 115a. Another large-diameter piston 115b disposed in opposition to the first-said large-diameter piston 115a is provided at the lower end of the tubular passage 114b. The pressure chamber 118 is constituted from said small-diameter cylinder 110, large-diameter cylinder 116, a passage in the holding member 114a, small-diameter piston 113, and two large-diameter pistons 115a and 115b. Provided below the small-diameter cylinder 110 are the first check valve 26 and the second check valve 31. Also, a liquid suction hole 41 for sucking in the liquid in the inverted condition of the sprayer is provided such that it will be located slightly below the position where the large-diameter piston 115b in the large-diameter cylinder 116 stays when the pressure chamber 118 is in its maximum capacity condition. A skirt 142 is provided to the tubular passage 114b above the large-diameter piston 115b to prevent liquid leakage when the sprayer is brought to its inverted position. The first and second check valves in this second embodiment may be modified similarly to the first embodiment.

The operations of the first and second check valves 26, 31 and the suction hole 41 in the above-described second embodiment are same as those in the first embodiment. Other spraying operations are also basically same. Thus, when pressure is built up in the pressure chamber 118, the large-diameter piston 115*a* descends to open the valve hole 21.

Figure 6:
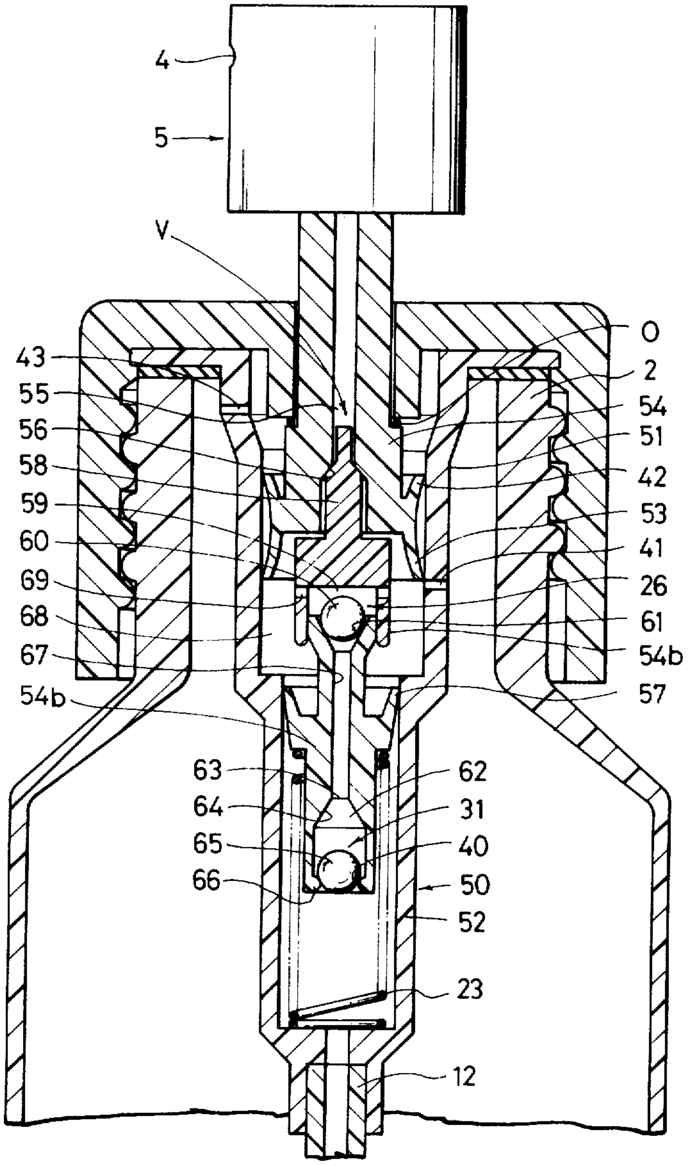
FIG. 6 is a sectional view of the principal parts of a sprayer according to a third embodiment of this invention.
Figure 7A:
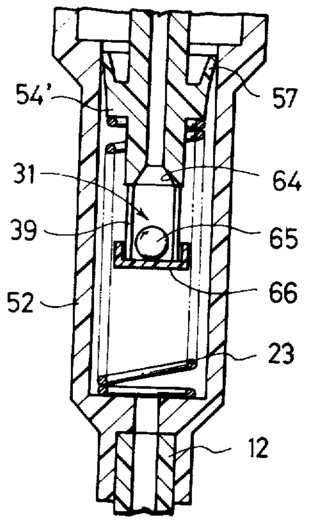
FIGS. 7A and 7B are sectional views showing modifications of the second check valve in the third embodiment of this invention.
Figure 7B:
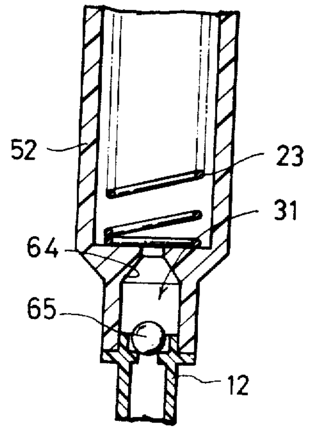

FIG. 6 and FIGS. 7A and 7B show a sprayer device according to a third embodiment of this invention. In this embodiment, the vertical positional relation of the first and second check valves is reversed as the opening and closing mechanism of the discharge valve V leading to the nozzle hole 4 is changed.

The cylinder 50 secured to the neck portion 2 of the liquid container 1 is formed from an upper large-diameter portion 51 and a lower small-diameter portion 52, and the lower end of the small-diameter portion 42 is in communication with the bottom of the liquid container 1 through the suction pipe 12. A large-diameter piston 53 is inserted into the large-diameter cylinder portion 51 and connected to the spray head 5 through a tubular holding member 54. Provided in said large-diameter piston 43 and holding member 54 is a passage 55 which connects to the nozzle hole 4, and a valve seat 56 is formed below said passage 55. A small-diameter piston 57 is inserted into the small-diameter cylinder portion 52, and the first and second check valves 26 and 31 are incorporated in the holding member 54*b* of said small-diameter piston 57. Provided above said holding member 54*b* is the valve body 58 which abuts against said valve seat 56. Said holding member 54*b* is formed from two upper and lower members joined integral to each other. The upwardly positioned first check valve 26 is constituted from a valve chamber 59 communicated with the large-diameter cylinder portion 51 through a communication hole 69, a ball valve 60, and a valve seat 61 having a valve hole closed by said ball valve, while the downwardly positioned second check valve 31 is constituted from a valve chamber 62 communicated with the lower part of the small-diameter cylinder 52, a valve seat 64 having a valve hole 63, a ball valve 65 and a ball valve support member 66. The two check valves 26 and 31 are communicated with each other through a passage 67. The second check valve 31 is designed to allow formation of a sufficient space 40 between the ball valve 65 and the peripheral wall of the valve chamber 62 or the support member 66 as in the case of the first embodiment. In the second check valve 31, the support member 66 may be constructed like a saucer as in the case of FIG. 4A and a liquid passage 39 may be formed sidewise of the ball valve 65 as shown in FIG. 7A. It is also possible to incorporate the second check valve 31 integrally in the lower part of the small-diameter cylinder portion 52 as shown in FIG. 7B. The pressure chamber 68 is formed from said large-diameter cylinder portion 51, small-diameter cylinder portion 52, large-diameter piston 53, small-diameter piston 57 and first check valve 26. In operation, when the spray head 5 is depressed against the coil spring 23 to build up pressure in the pressure chamber 68, the small-diameter piston 57 descends to let the valve body 58 separate from the valve seat 56, allowing feed of the pressurized liquid to the nozzle hole 4. A liquid inlet hole 41 is provided at the central part of the large-diameter cylinder 51 for admitting the liquid into the pressure chamber 68 when the sprayer is brought to its inverted position. Said inlet hole 41 is so located that it will be positioned slightly below the large-diameter piston 53 in the large-diameter cylinder portion 51 when the pressure chamber 68 is maximized in its capacity. Also, a skirt 42 is provided to the mounting member 54 above the large-diameter piston 53 to prevent liquid leakage when the sprayer is in its inverted condition. Other arrangements are same as in the first embodiment. Although the opening operation for the valve hole in the valve seat 56 leading to the nozzle hole is different, the operation for pressurizing the pressure chamber 68 or sucking the liquid into said chamber 68 by switching over the first and second check valves 26, 31 is same as in the first embodiment.

Figure 7C:
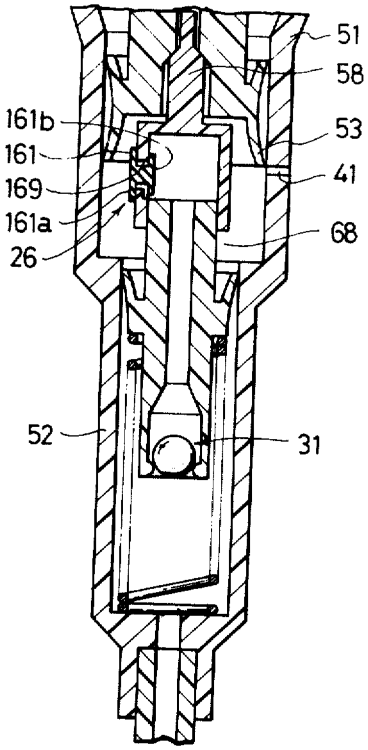
FIG. 7C is a sectional view showing a modification of the first check valve in the third embodiment of this invention.

A modification of the first check valve 26 in the third embodiment is illustrated in FIG. 7C. In this modification, the liquid passing hole 69 provided in the valve chamber 59 of the first check valve 29 is substituted by a valve hole 169 and a rubber valve 161 is adapted to said valve hole 169. The rubber valve 161 is composed of a flat plate portion 161*a* adapted to open or close the valve hole 169 and a base portion 161*b* mounted to the valve hole 169 and is designed to allow flow of the liquid only into the pressure chamber 68 from the second check valve 31 through the space between the valve hole 169 and the base portion 161*b*.

The first and second check valve switching operation in this third embodiment is same as in the first embodiment and ensures perfect inhibition of suction of the liquid and flow of the air into the pressure chamber. At an upper part of the large-diameter cylinder portion 51 is provided a small hole 43 for preventing build-up of negative pressure in the liquid container 1. When the spray head is depressed, the oil seal ring O provided between the spray head and holding member 54 is moved away from the wall surface of the spray head to form a space through which the outer air is sucked in.

Figure 8:
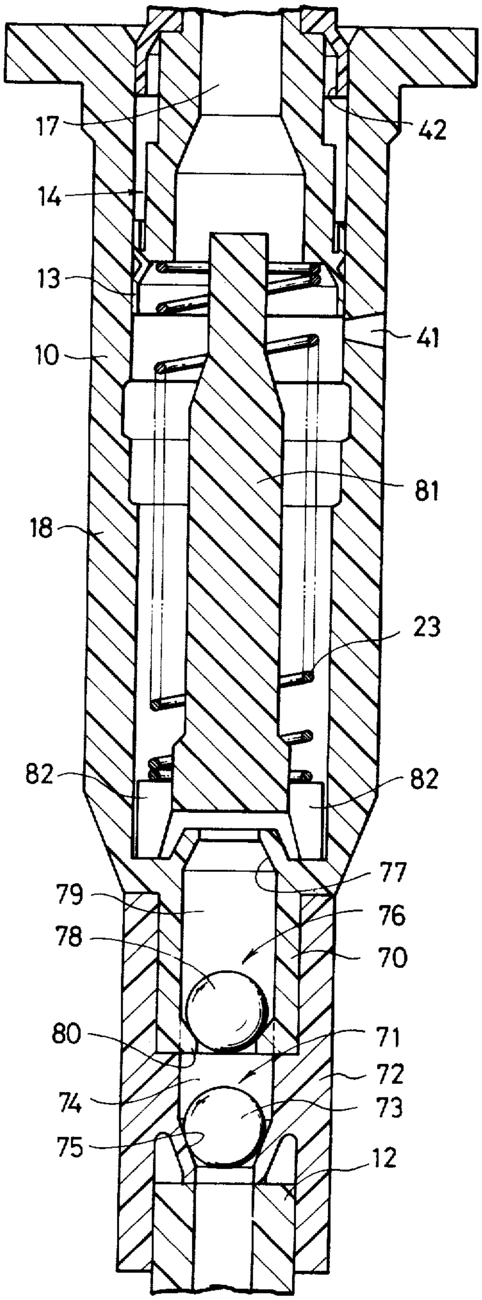
FIG. 8 is a sectional view of the principal parts of the pump mechanism incorporated in the sprayer device according to this invention.

Referring now to FIG. 8, there is shown a pump mechanism adaptable in the sprayer device of this invention. Although the pump mechanism is here described as it was adapted in the sprayer device according to the first embodiment of this invention, it can as well be used in a sprayer having no discharge valve opening and closing means such as employed in the first embodiment. This pump mechanism is easy to assemble and allows easy inspection of the check valve.

The pressure chamber 18 is constituted from a small-diameter cylinder 10, a small-diameter piston 13, a tubular passage 17 in a tubular holding member 14, a large-diameter piston 15 and a large-diameter cylinder 16. A small cylindrical member 70 projects out downwardly from the lower end of said small-diameter cylinder 10, and the valve box 72 of the first check valve 71 is fitted with said small cylindrical member 70. The first check valve 71 allows liquid flow into the pressure chamber 18. The valve box 72 is provided with a valve chamber 74 housing a ball valve 73 and a valve seat 75 on which said ball valve 73 rests. Extending out from the bottom end of said valve box 72 is a suction pipe 12 which connects into the liquid container. Housed in the small cylindrical member 70 is the second check valve 76 designed to allow liquid flow into the liquid container. Said second check valve 76 is constituted from a valve seat 77 provided at the upper end of said cylindrical member 70, a valve chamber 79 housing a ball valve 78, and a support member 80 for said ball valve 78. Although a space is formed between the ball valve 78 and the valve chamber 79 for passing the liquid in the shown embodiment, it is also possible to construct the support member 80 like a saucer and form a liquid passage sidewise thereof as in the case of the first embodiment.

Alternatively, the first check valve 71 may be formed in the small cylondrical member 70 and the second check valve 76 in the valve box 72. Other arrangements, for example the hole 41 for sucking in the liquid in use of the inverted sprayer and the skirt member 42 for preventing liquid leakage, are same as in the first embodiment. Where it is required to elevate the pressurizing efficiency in the pressure chamber 18, an insert bar 81 is provided in the lower part of the pressure chamber 18 and such insert bar 81 is secured in position by a coil spring 23. In this case, the lower end of the insert bar 81 is cut out to provide the liquid passages 82 to communicate the pressure chamber 18 with the valve chamber 79 of the second check valve 76.

This pump mechanism is same in operation as that of the first embodiment and can perform its functions to build up pressure in the pressure chamber and suck up the liquid into the pressure chamber no matter whether the sprayer is in its erect or inverted state. Thus, according to this arrangement, the liquid flow wont't be obstructed by the ball valve of the second check valve when the liquid is sucked up in use of the sprayer in its erect position. Also, the pump mechanism of this embodiment, as compared with that of the first embodiment having the second check valve incorporated in the lower part of the insert bar 25, is easier to manufacture and requires no particularly high accuracy for obtaining water-tightness between the outer periphery of the lower portion of the insert bar 25 and the inner wall of the small-diameter cylinder 10, and it allows smooth flow of the liquid between the second check valve 75 and the pressure chamber 18. Further, since the first check valve 71 can be set in position by merely fitting the valve box 72 on the small cylindrical member 71, this pump mechanism is easy to assemble and also easy of access to the check valves for inspection thereof.

What is claimed is:

1. Sprayer usable in both erect and inverted states comprising a pressure chamber consisting of a cylinder and a piston, a first check valve provided in a passage communicating the lower part of said pressure chamber with a liquid container for allowing liquid flow into said pressure chamber alone, a coil spring adapted to actuate the piston to suck the liquid into said pressure chamber, a piston holding member extending upwardly from said piston, and a nozzle hole for spraying out the pressurized liquid in said pressure chamber, characterized by a liquid suction hole provided such that it will be located slightly below the position of the piston in the cylinder at which the internal capacity of the pressure chamber is maximized, said suction hole being designed to allow the liquid in the liquid container to flow into the pressure chamber through the neck portion of said container when the sprayer is turned to its inverted use position, a skirt member provided to the piston holding member above the piston for preventing liquid leakage from said suction hole to the area above the cylinder when the sprayer is brought to its inverted position, and a second check valve provided in series relation to the first check valve in the passage between the pressure chamber and the liquid container and arranged countercurrent to the first check valve, whereby suction of the liquid or inhibition of air flow into the pressure chamber is perfectly accomplished by said two check valves when the sprayer is brought to its either erect or inverted position for use.

2. The sprayer according to claim 1, wherein the second check valve is constituted from a valve seat having a valve hole, a ball valve and a support member for said ball valve, said support member being shaped like a saucer having a plane vertical to the axis of the cylinder, and a liquid passage is formed between the outer peripheral edge of said support member and the inner wall of the cylinder, said passage leading to the pressure chamber and the first check valve.

3. The sprayer according to claim 1, wherein a bar for increasing the pressurizing efficiency in the pressure chamber is secured to the bottom of the cylinder and the second check valve is integrally incorporated in the lower part of said bar.

4. The sprayer according to claim 1, wherein the first check valve is constituted from a ball valve and a valve seat having a valve hole.

5. The sprayer according to claim 1, wherein the first check valve is constituted from a valve seat having a valve hole and a rubber valve having a sealing surface able to close said valve hole.

6. The sprayer according to claim 1, wherein a small hole is provided at the upper end of the cylinder, said small hole communicating the inside of the liquid container with the top opening of the cylinder and designed to allow passage of the air but not the liquid, thereby to prevent build-up of negative pressure in the liquid container.

7. The sprayer according to claim 1, wherein the pressure chamber is constituted from an upper large-diameter cylinder, a small-diameter cylinder provided with a liquid suction hole and a liquid passing tube provided in said piston holding member, the mechanism further comprising a large-diameter piston provided to the opposite end of said piston holding member from the first mentioned piston and designed slidable in said large-diameter cylinder, and a valve body mounted to said holding member for opening and closing the valve hole communicated to the nozzle hole, whereby the valve communicated to the nozzle hole is opened by the valve body by making use of the difference of force produced between said piston and the large-diameter piston when pressure is acted thereto.

8. The sprayer according to claim 1 wherein the cylinder is constituted from a large-diameter portion provided with a liquid suction hole and having said piston inserted thereinto and a small-diameter portion positioned below said large-diameter portion, the mechanism further comprising a small-diameter piston slidable in said small-diameter cylinder portion and having a valve body mounted thereabove, a valve hole leading to the nozzle hole, said valve hole being provided in said piston and arranged to be closed by said valve body, and a liquid passage provided in the holding member of said small-diameter piston for communicating the liquid container with the pressure chamber constituted from said cylinder and said large-diameter and small-diameter pistons, wherein the first check valve is incorporated at a position upward of said liquid passage and when pressure is built up in the pressure chamber, the small-diameter piston descends to let the valve body open the valve hole leading to the nozzle hole.

9. The sprayer according to claim 8, wherein the second check valve is incorporated at a position below the first check valve in the liquid passage in said holding member.

10. The sprayer according to claim 8, wherein the second check valve is incorporated integrally at the lower end of the small-diameter cylinder portion.

11. The sprayer according to claim 8, wherein the first check valve is constituted from a valve seat having a valve hole and a rubber valve having a sealing surface able to close said valve hole.

12. The sprayer according to claim 8, wherein the second check valve is constituted from a valve seat having a valve hole, a ball vaıve and a ball valve support member formed like a saucer, and a liquid passage is provided between the outer periphery of said support member and the inner wall of the cylinder for communicating the pressure chamber with the first check valve.

13. Sprayer usable in both erect and inverted states comprising a cylinder held in the neck portion of a liquid container and formed from an upper large-diameter portion and a lower small-diameter portion, a first large-diameter piston slidable in said large-diameter cylinder portion and a small-diameter piston slidable in said small-diameter cylinder portion, said both pistons being connected by a holding member, a valve body provided above said large-diameter piston and adapted to open and close a valve hole leading to the nozzle in the spray head, a tubular liquid passage having said valve body inserted therein and connected at its upper end to the valve hole, said tubular passage also having mounted at its lower end a second large-diameter piston slidable in the large-diameter cylinder portion, a coil spring pressing the small-diameter piston upwardly, a pressure chamber consisting of said small-diameter cylinder, large-diameter cylinder, small-diameter piston, first and second large-diameter pistons and holding member, and a first check valve provided in a passage communicating the lower part of the pressure chamber with the liquid container and arranged to allow liquid into the pressure chamber alone, wherein the liquid is sucked in from the lower end of the small-diameger piston by the sliding movements of said respective pistons to build up pressure and then the liquid is sprayed from the nozzle hole through the valve hole, characterized by a liquid suction hole provided such that it will be positioned slightly below the position taken by the second large-diameter piston in the large-diameter cylinder portion when the pressure chamber is maximized in its capacity, said suction hole being arranged to admit the liquid into the pressure chamber from the neck portion of the liquid container when the sprayer is brought to its inverted use position, a skirt member provided to the tubular liquid passage above the second large-diameter piston for preventing liquid leakage from said suction hole to the area above the cylinder when the sprayer is turned to its inverted position, and a second check valve provided in series relation to the first check valve in the passage between the pressure chamber and the liquid container and arranged in counter-current relation to said first check valve, whereby suction of the liquid or flow of the air into the pressure chamber is perfectly inhibited by said two check valves when the sprayer is brought to its either erect or inverted position for use.

14. The sprayer according to claim 13, wherein the second check valve is constituted from a valve seat having a valve hole, a ball valve and a ball valve support member, said support member being formed like a saucer having a plane vertical to the axis of the cylinder, and a liquid passage is provided between the outer periphery of said supporting member and the inner wall of the cylinder, said passage connecting to the pressure chamber and the first check valve.

15. A pump mechanism for a sprayer usable in both erect and inverted positions comprising a liquid container and a pressure means including a pressure chamber formed from a cylinder and a piston for sucking up the liquid from the liquid container and pressurizing said liquid for spraying it from the nozzle hole, a piston mounting member extending upwardly from said piston, said pump mechanism comprising a liquid suction hole provided such that it will be positioned slightly below the location of the piston in the cylinder when the pressure chamber becomes largest in its capacity, said suction hole being designed to allow suction of the liquid when the sprayer is in its inverted position, a skirt member provided slightly above that position of the piston mounting member which corresponds to said suction hole when the pressure chamber is maximized in capacity, said skirt member contacting air tightly against the cylinder, a small cylindrical member extending downwardly from the lower end of the cylinder and communicated with the pressure chamber, a valve body fitted on said small cylindrical member, a first check valve provided either in said small cylindrical member or in said valve box for allowing liquid flow into the pressure chamber alone, and a second check valve arranged in countercurrent relation to said first check valve, whereby the valve hole in the valve seat is not closed by the ball valve of the first check valve when the liquid is sucked into the pressure chamber through the first check valve with the sprayer being in its erect position.

16. The pump mechanism according to claim 15, further comprising a bar extending upwardly from a lower part in the pressure chamber for increasing the pressurizing efficiency, said bar being secured to the bottom of the cylinder.

17. The pump mechanism according to claim 15, wherein the second check valve is constituted from a ball valve, a valve seat and a ball valve support member, said support member being constructed in the form of a saucer having a plane vertical to the axis of the cylinder, and a liquid passage is provided between the outer periphery of said support member and the inner wall of the small cylindrical portion, said liquid passage being connected into the pressure chamber.

* * * * *